J. B. BAMFORD.
AUTOMOBILE WHEEL ATTACHMENT.
APPLICATION FILED JUNE 22, 1914.
1,151,436.
Patented Aug. 24, 1915.
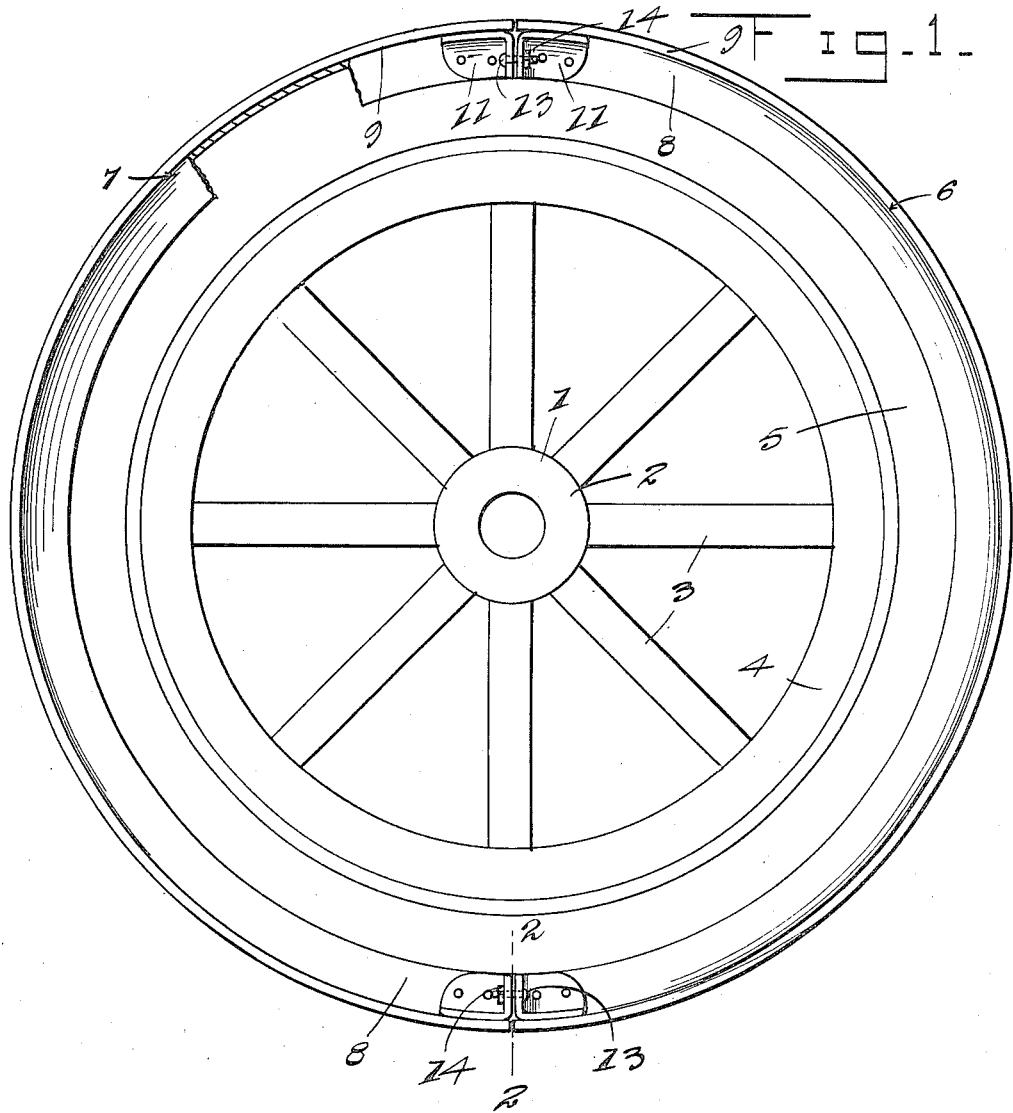
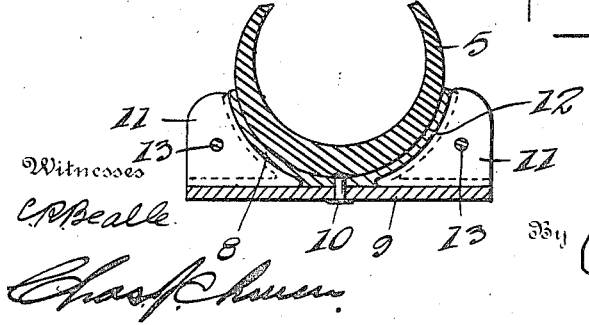
Witnesses
C. P. Bealle
Chas. P. Chown
Inventor
J. B. Bamford.
By
Attorney

UNITED STATES PATENT OFFICE.

JAMES B. BAMFORD, OF JUNCTION CITY, OREGON.

AUTOMOBILE WHEEL ATTACHMENT.

1,151,436. Specification of Letters Patent. Patented Aug. 24, 1915.

Application filed June 22, 1914. Serial No. 846,610.

*To all whom it may concern:*

Be it known that I, JAMES B. BAMFORD, a citizen of the United States of America, residing at Junction City, in the county of Lane and State of Oregon, have invented certain new and useful Improvements in Automobile Wheel Attachments; and I do hereby declare the following to be a full, clear, and exact description of the invention, such as will enable others skilled in the art to which it appertains to make and use the same.

My invention relates to improvements in pulley attachments for automobile wheels and has for its primary object to provide a simple and effective wheel attachment by means of which a pulley belt may be attached to the wheel and which will also serve as a flat and relatively wide tread surface for the wheel and could be used for that purpose if desired.

Another object is to provide an attachment of the character described that will not only serve as a pulley but as a traction wheel attachment and is so constructed as to be readily assembled and disassembled relative to the tire of the wheel and which is inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of an automobile wheel showing my improved attachment thereon, and Fig. 2 is a vertical sectional view taken on line 2—2 of Fig. 1 showing the means to secure the attachment in elevation.

Referring to the drawings by characters of reference, the numeral 1 designates as an entirety, an automobile or vehicle wheel which consists of a hub 2, spokes 3, rim 4 and tire 5 mounted in the usual manner upon the rim.

My invention consists of similar semi-annular sections 6 and 7, each of which consists of a metallic semi-circular plate 8 that is curved or semi-circular in cross section to conform to the shape of the tire 5 and designed to fit snugly about the tread portion thereof. Mounted upon the tread portion of each of the plates 8 is a semi-circular base plate 9 that is flat and relatively wide so as to form a bearing surface for a belt or to act as a tread for the vehicle if so desired. The plates 9 are secured by rivets 10 or other suitable fastening elements centrally of their longitudinal edges to a point centrally of the longitudinal edges of the plates 8. The sections 6 and 7 are identical as to construction and are positioned upon the tire 5 so that their ends meet or nearly come into contact with one another. The ends of the plates 8 and 9 are flush with one another to provide an even joint.

As a means for joining the meeting ends of the sections 6 and 7 so that a complete belt surface or tread surface as the case may be is provided throughout the periphery of the wheel, I provide angular brackets 11 that have the portions thereof adjacent to the curved faces of the tire 5 curved as at 12 correspondingly so as to conform to the tire. These brackets 11 are riveted or otherwise suitably secured to the plates 8 and 9 and have their outer end faces flush with the outer end faces of said plates so that the members 11 that are opposed, engage or nearly engage each other. A pair of the brackets 11 is arranged at each end of the sections. Bolts or other suitable fastening elements 13 are inserted through the opposed faces of the brackets and have nuts 14 turned on their threaded terminals. These bolts serve to securely hold the sections 6 and 7 comprising the attachment in operative position upon the tire so that the attachment be utilized as a pulley or provide a traction wheel, or in other words a wide bearing surface for the wheel, suitable in muddy roads and the like.

It will be readily seen that my improved attachment may be easily removed by simply unscrewing the nuts 14 and removing the bolts 13 and as easily replaced.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

An automobile wheel attachment consisting of a pair of semicircular sections the said sections conforming to the shape of the tire, a semicircular base plate having a flat tread portion secured to each of the semicircular sections and having a plurality of angular brackets secured to each of the semicircular sections, and thereby providing means for securing the semicircular sections and base plates around the tire of said wheel.

In testimony whereof I affix my signature in presence of two witnesses.

JAMES B. BAMFORD.

Witnesses:
B. E. FRALEY,
J. E. McMILLIN.